(12) United States Patent
Shuai et al.

(10) Patent No.: US 12,424,022 B2
(45) Date of Patent: Sep. 23, 2025

(54) DISPLAY PANEL AND DISPLAY DEVICE

(71) Applicant: WUHAN CHINA STAR OPTOELECTRONICS TECHNOLOGY CO., LTD., Hubei (CN)

(72) Inventors: Chuan Shuai, Hubei (CN); Guiyang Zhang, Hubei (CN); Yaqiong Long, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/297,545

(22) PCT Filed: May 18, 2021

(86) PCT No.: PCT/CN2021/094313
§ 371 (c)(1),
(2) Date: Jan. 3, 2024

(87) PCT Pub. No.: WO2022/227133
PCT Pub. Date: Nov. 3, 2022

(65) Prior Publication Data
US 2024/0127623 A1    Apr. 18, 2024

(30) Foreign Application Priority Data

Apr. 28, 2021 (CN) .......................... 202110467234.7

(51) Int. Cl.
*G06V 40/13* (2022.01)
*G02B 27/30* (2006.01)

(52) U.S. Cl.
CPC ......... *G06V 40/1329* (2022.01); *G02B 27/30* (2013.01); *G06V 40/1318* (2022.01)

(58) Field of Classification Search
CPC . G06V 40/1329; G06V 40/1318; G02B 27/30
See application file for complete search history.

(56) References Cited

U.S. PATENT DOCUMENTS

2013/0034274 A1    2/2013  Wu
2018/0300525 A1*  10/2018  Fourre ............... G06V 40/1394
(Continued)

FOREIGN PATENT DOCUMENTS

CN    101173144 A  *  5/2008
CN    105184248 A     12/2015
(Continued)

OTHER PUBLICATIONS

Translation of CN-111126342-A (Year: 2020).*
(Continued)

*Primary Examiner* — Lixi C Simpson
(74) *Attorney, Agent, or Firm* — Rivka Friedman

(57) ABSTRACT

The present application discloses a display panel and a display device. The display panel includes a fingerprint recognition area. The display panel includes a cover plate and an optically transparent layer. The optically transparent layer at least covers a portion of the cover plate located in the fingerprint recognition area. A refractive index of the optically transparent layer is greater than a refractive index of air and less than a refractive index of a finger. A thickness of the optically transparent layer is an even multiple of a half-wavelength of a fingerprint recognition light ray. Half-wave loss and interference of light are used to improve fingerprint recognition performance.

20 Claims, 2 Drawing Sheets

(56) References Cited

U.S. PATENT DOCUMENTS

2020/0327296 A1* 10/2020 Wu .................. H01L 24/48
2021/0334500 A1* 10/2021 Huang ................ G06V 10/145

FOREIGN PATENT DOCUMENTS

| | | | | |
|---|---|---|---|---|
| CN | 105678255 A | | 6/2016 | |
| CN | 106934384 A | | 7/2017 | |
| CN | 107392132 A | | 11/2017 | |
| CN | 207799121 U | | 8/2018 | |
| CN | 108629244 A | | 10/2018 | |
| CN | 108690517 A | * | 10/2018 | ............... C09J 7/29 |
| CN | 110376782 A | | 10/2019 | |
| CN | 111126342 A | * | 5/2020 | ......... G06K 9/00006 |
| CN | 211087274 U | | 7/2020 | |
| CN | 112334909 A | | 2/2021 | |
| CN | 112578948 A | | 3/2021 | |
| EP | 3457262 A1 | | 3/2019 | |
| EP | 3485342 B1 | | 2/2021 | |
| JP | 2017214233 A | * | 12/2017 | |
| KR | 20030043840 A | | 6/2003 | |

OTHER PUBLICATIONS

Translation of JP-2017214233-A (Year: 2017).*
Translation of CN-101173144-A (Year: 2008).*
Translation of CN-108690517-A (Year: 2018).*
The extended European search report issued in corresponding European Patent Application 21735140.2, dated Feb. 5, 2025. pp. 1-9.
Lee S-D et al: "Optics of organic thin films and devices" Optical Materials, Elsevier Science, Publishers B.V. Amsterdam, NL, vol. 21, No. 1-3, Jan. 1, 2003 (Jan. 1, 2003), pp. 611-619, XP004395494, ISSN: 0925-3467, DOI: 10.1016/S0925-3467(02)00210-0.

* cited by examiner

DISPLAY PANEL AND DISPLAY DEVICE

FIELD OF DISCLOSURE

The present application relates to a field of display technology and in particular, to a display panel and a display device.

DESCRIPTION OF RELATED ART

In the field of small and medium-sized displays, full-screen technology has become a major development direction. To realize full-screen, it requires fingerprint recognition, cameras, facial recognition, distance sensors, and other sensors at display terminals be further integrated into display areas of displays, so that the displays can gradually make a transition from a simple display interface to a comprehensive perceptual and interactive interface.

However, due to limitations of conventional techniques and materials, it is difficult to improve fingerprint recognition performance in current full-screen products.

SUMMARY

Technical Problem

Embodiments of the present application provide a display panel and a display device, which can improve fingerprint recognition performance by increasing contrast between ridges and valleys of a fingerprint.

Technical Solution

The present application provides a display panel, comprising: a fingerprint recognition area, a cover plate, and an optically transparent layer, wherein the optically transparent layer at least covers a portion of the cover plate disposed in the fingerprint recognition area, a refractive index of the optically transparent layer is greater than a refractive index of air and less than a refractive index of a finger, and a thickness of the optically transparent layer is an even multiple of a half-wavelength of a fingerprint recognition light ray.

Optionally, in some embodiments, the refractive index of the optically transparent layer is greater than one and less than 1.4.

Optionally, in some embodiments, the optically transparent layer is disposed in the fingerprint recognition area.

Optionally, in some embodiments, the optically transparent layer covers a portion of the cover plate disposed in the fingerprint recognition area and a portion of the cover plate extending outside the fingerprint recognition area.

Optionally, in some embodiments, the optically transparent layer completely covers the cover plate.

Optionally, in some embodiments, the optically transparent layer is an inorganic layer.

Optionally, in some embodiments, a material of the optically transparent layer comprises silicon dioxide doped with metal oxide particles.

Optionally, in some embodiments, the optically transparent layer is an organic layer.

Optionally, in some embodiments, a material of the optically transparent layer comprises acrylate doped with metal oxide particles.

Optionally, in some embodiments, light transmittance of the optically transparent layer is greater than 95%.

Optionally, in some embodiments, the display panel further comprises a light collimating unit, the light collimating unit is disposed in the fingerprint recognition area, and the light collimating unit is configured to collimate the fingerprint recognition light ray.

The present application further provides a display device comprising a display panel, wherein the display panel comprises a fingerprint recognition area, a cover plate, and an optically transparent layer, the optically transparent layer at least covers a portion of the cover plate disposed in the fingerprint recognition area, a refractive index of the optically transparent layer is greater than a refractive index of air and less than a refractive index of a finger, and a thickness of the optically transparent layer is an even multiple of a half-wavelength of a fingerprint recognition light ray.

Optionally, in some embodiments, the refractive index of the optically transparent layer is greater than one and less than 1.4.

Optionally, in some embodiments, the optically transparent layer is disposed in the fingerprint recognition area.

Optionally, in some embodiments, the optically transparent layer covers a portion of the cover plate disposed in the fingerprint recognition area and a portion of the cover plate extending outside the fingerprint recognition area.

Optionally, in some embodiments, the optically transparent layer completely covers the cover plate.

Optionally, in some embodiments, the optically transparent layer is an inorganic layer.

Optionally, in some embodiments, the optically transparent layer is an organic layer.

Optionally, in some embodiments, light transmittance of the optically transparent layer is greater than 95%.

Optionally, in some embodiments, the display panel further comprises a light collimating unit, the light collimating unit is disposed in the fingerprint recognition area, and the light collimating unit is configured to collimate the fingerprint recognition light ray.

Advantages of the Present Application

In the display panel and the display device of the present application, the optically transparent layer is disposed on the cover plate in the fingerprint recognition area. On the one hand, the refractive index of the optically transparent layer is set to be greater than the refractive index of air and less than the refractive index of the finger. According to a principle of light, a half-wave loss occurs when light is incident from an optically thin medium to get reflected at an optically dense medium, while no half-wave loss occurs when light is incident from the optically dense medium to get reflected at the optically thin medium. Accordingly, at a position where ridges of the finger contact the display panel, the fingerprint recognition light ray is incident from the optically thin medium to the optically dense thin medium, and a reflected fingerprint recognition light ray has the half-wave loss. At a position where valleys of the finger contact the display panel, due to the presence of an air medium between the finger and the display panel, the fingerprint recognition light ray is incident from the optically dense medium to the optically thin medium, and a reflected fingerprint recognition light ray does not have the half-wave loss. On the other hand, the thickness of the optically transparent layer is set to even multiples of the half-wavelength of the fingerprint recognition light ray, so that an optical path difference between reflected light rays generated by the same fingerprint recognition light ray reflected from two surfaces of the optically transparent layer is an integer multiple of a wavelength of the fingerprint recognition light ray. According to a principle of light interference, at the valleys of the fingerprint, reflected fingerprint recognition light rays reflected off the two surfaces of the optically transparent layer experience constructive interference, thus enhancing intensity of the fingerprint recognition light ray reflected at the valleys of the fingerprint. At the ridges of the fingerprint, due to the half-wave loss, a phase difference between reflected recognition light rays reflected off the two surfaces of the optically transparent layer is an odd multiple of π, and as a result, the reflected fingerprint recognition light rays reflected off the two surfaces of the optically transparent layer experience destructive interference, thus reducing the intensity of the fingerprint recognition light ray reflected at the valleys of the fingerprint. That is to say, by means of the optically transparent layer, the half-wave loss, and the principle of light interference, the present application increases a reflection difference between the ridges and the valleys of the fingerprint, improves contrast between the ridges and the valleys of the fingerprint, and thereby enhances fingerprint recognition performance.

BRIEF DESCRIPTION OF DRAWINGS

A detailed description of the present application is provided below in reference to specific embodiments and in conjunction with the accompanying drawings, so as to make the technical solutions and other beneficial effects of the present application easy to understand.

DETAILED DESCRIPTION OF EMBODIMENTS

The present application provides a display panel and a display device. Half-wave loss occurs when light is incident from an optically thin medium to get reflected at an optically dense medium, and no half-wave loss occurs when light is incident from the optically dense medium to get reflected at the optically thin medium. The above principle of half-wave loss can be used to reduce intensity of reflected light rays at ridges of a fingerprint, increase a reflection difference between the ridges and valleys of the fingerprint, and improve contrast between the ridges and the valleys of the fingerprint, thereby improving fingerprint recognition performance. Detailed descriptions are provided below. It should be noted that a sequence of describing following embodiments is not meant to limit an order of preference of the embodiments.

Figure 1:
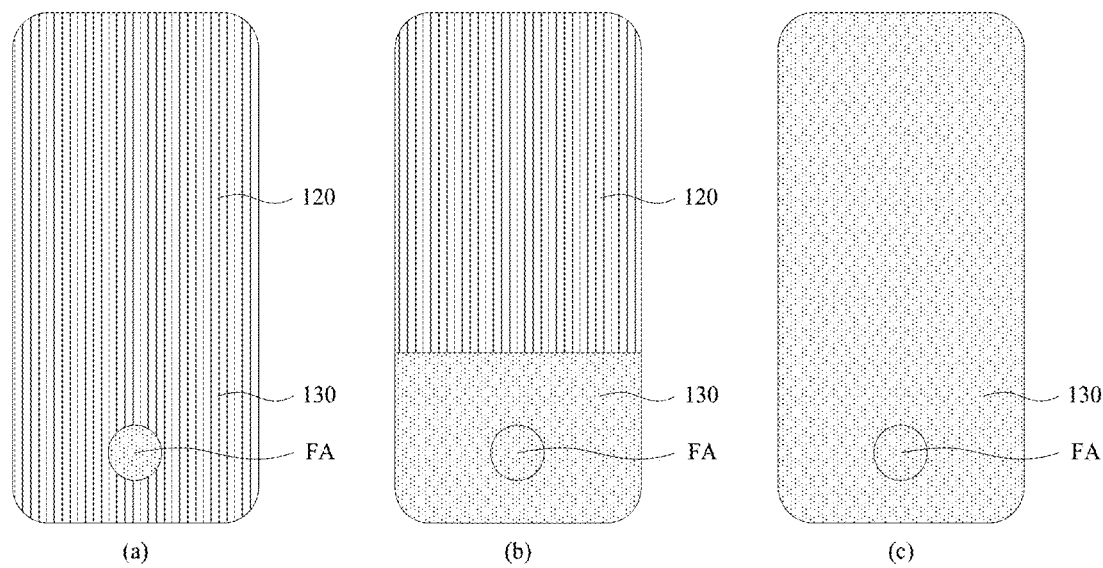
FIG. 1 is a schematic plan view of a display panel according to one embodiment of the present application.
Figure 2:
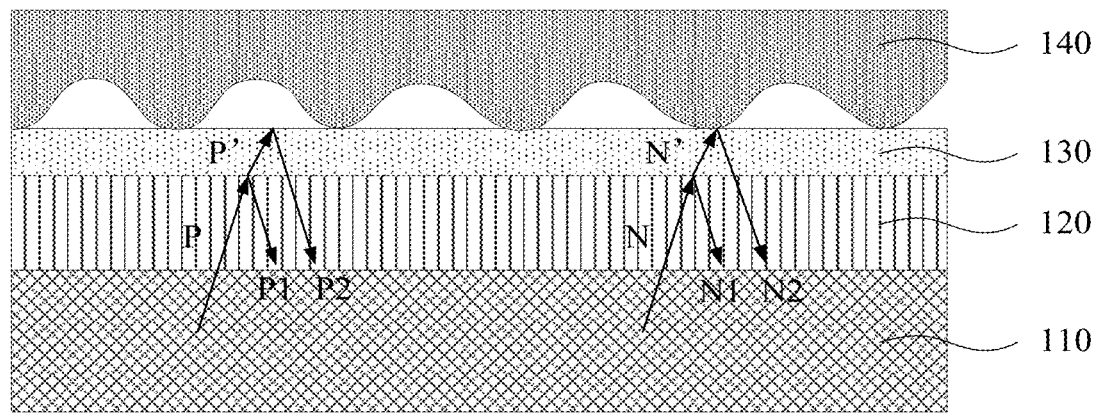
FIG. 2 is a schematic cross-sectional structural view illustrating the display panel according to one embodiment of the present application.

One embodiment is shown in FIG. 1 and FIG. 2. FIG. 1 shows a schematic plan view of a display panel according to one embodiment of the present application. FIG. 2 shows a schematic cross-sectional structural view of the display panel according to one embodiment of the present application, and particularly shows a cross-sectional structural view of an area marked by FA in FIG. 1. As shown in FIGS. 1 and 2, the display panel of the present embodiment comprises a fingerprint recognition area FA. The display panel includes a display stacked layer 110, a cover plate 120, and an optically transparent layer 130. The optically transparent layer 130 is disposed on one side of the cover plate 120 away from the display stacked layer 110 and at least covers a portion of the cover plate 120 disposed in the fingerprint recognition area FA. A refractive index of the optically transparent layer 130 is greater than a refractive index of air and less than a refractive index of a finger. A thickness of the optically transparent layer 130 is an even multiple of a half-wavelength of a fingerprint recognition light ray. The display panel recognizes a fingerprint 140 on one side of the optically transparent layer 130. The refractive index of air is about 1, and the refractive index of skin of the human finger is about 1.4, so a range of the refractive index of the optically transparent layer 130 is greater than 1 and less than 1.4 in the present embodiment.

In the present application, the optically transparent layer is disposed on the cover plate in the fingerprint recognition area. On the one hand, the refractive index of the optically transparent layer is set to be greater than the refractive index of air and less than the refractive index of the finger. Half-wave loss occurs when light is incident from the optically thin medium to get reflected at the optically dense medium, while no half-wave loss occurs when light is incident from the optically dense medium to get reflected at the optically thin medium. Accordingly, at a position where the ridges of the finger contact the display panel, the fingerprint recognition light ray is incident from the optically thin medium to the optically dense thin medium, and a reflected fingerprint recognition light ray has half-wave loss. At a position where the valleys of the finger contact the display panel, due to the presence of an air medium between the finger and the display panel, the fingerprint recognition light ray is incident from the optically dense medium to the optically thin medium, so the reflected fingerprint recognition light ray does not have the half-wave loss. On the other hand, the thickness of the optically transparent layer is set to even multiples of the half-wavelength of the fingerprint recognition light ray, so that an optical path difference between reflected recognition light rays generated by the same light ray reflected off two surfaces of the optically transparent layer is an integer multiple of a wavelength of the fingerprint recognition light ray. According to a principle of light interference, at the valleys of the fingerprint, reflected fingerprint recognition light rays reflected at two surfaces of the optically transparent layer interfere with each other constructively, thus enhancing intensity of the fingerprint recognition light ray reflected at the valleys of the fingerprint. At the ridges of the fingerprint, due to the half-wave loss, a phase difference between reflected fingerprint recognition light rays reflected at two surfaces of the optically transparent layer is an odd multiple of π, so the reflected fingerprint recognition light rays reflected at the two surfaces of the optically transparent layer interfere with each other destructively, thus reducing the intensity of the fingerprint recognition light ray reflected at the valleys of the fingerprint. That is, by disposing the optically transparent layer, the half-wave loss, and the principle of light interference, the present application increases the reflection difference between the ridges and the valleys of the fingerprint, improves the contrast between the ridges and the valleys of the fingerprint, and thereby enhances the fingerprint recognition performance.

Since the optically transparent layer 130 is disposed on a surface of the cover plate 120, light emitted by pixels in the display stacked layer 110 passes through the optically transparent layer 130, so transmittance of the optically transparent layer 130 is greater than 95%.

In one embodiment, the optically transparent layer 130 is an organic layer, and a material of the optically transparent layer 130 comprises, but is not limited to, acrylate doped with metal oxide particles, and the metal oxide particles are usually zirconium dioxide particles.

In one embodiment, the optically transparent layer 130 is an inorganic layer, and the material of the optically transparent layer 130 comprises, but is not limited to, silica doped with metal oxide particles, and the metal oxide particles are usually zirconium dioxide particles. The optically transparent layer 130 in the present embodiment is an inorganic layer, and hardness of the inorganic layer is greater than hardness of the organic layer, so such configuration is beneficial to improve wear resistance of the display panel.

In one embodiment, the display panel further comprises a light emitting unit and a light receiving unit, the light emitting unit is used to emit the fingerprint recognition light ray to the finger, and the light receiving unit is used to receive the fingerprint recognition light ray reflected by the finger. In the display panel of the present application, the light emitting unit and the light receiving unit can be disposed in the display stacked layer 110, or at least one of the light emitting unit or the light receiving unit can be disposed on one side of the display stacked layer 110 away from the cover plate 120. Furthermore, the display panel further comprises a light collimating unit. The light collimating unit is arranged in the fingerprint recognition area FA, and is arranged between the cover plate 120 and the light emitting unit and the light receiving unit. The light collimating unit is configured to collimate the fingerprint recognition light ray, so that the fingerprint recognition light ray entering the optically transparent layer 130 is a collimated light, which in advance prepares a condition for achieving the half-wave loss of the fingerprint recognition light ray at the ridges of the finger. Meanwhile, the reflected fingerprint recognition light ray received by the light receiving unit is a collimated light, so that the fingerprint recognition light ray can be better collected by the light receiving unit.

The display panel provided by the present application can be any one of an organic light emitting diode (OLED) display panel, a liquid crystal display (LCD) panel, or a light emitting diode (LED) display panel, etc., and the present application is not limited herein. In one embodiment, the display panel of the present application is an LCD display panel. The LCD display panel comprises an array substrate, a color filter substrate, and a liquid crystal layer between the array substrate and the color filter substrate. The color filter substrate comprises color filter layers arranged at intervals and arranged in an array, and a black matrix layer filled in gaps of the color filter layers. The light collimating unit is arranged in the black matrix layer and penetrates the black matrix layer, and the light receiving unit is arranged on one side of the array substrate close to the color filter substrate. Regarding arranging the light receiving unit corresponding to the light collimating unit, the arrangement of the light receiving unit can correspond to one light collimating unit, or multiple light collimating units. The light collimating unit is a pillar-shaped structure that penetrates the black matrix layer and can be a light-transmissive hole, or a transparent light-transmissive pillar, etc. It is preferable that the light collimating unit is a light-transmissive pillar, and as limited by a size of the display panel, a range of an aspect ratio of the light-transmissive pillar is 5:1 to 10:1.

Due to the limitation of the size of the display panel, the aspect ratio of the light collimating unit has a limit value, which results in limited improvement of the fingerprint recognition performance. However, from another angle, the display panel of the present application can further improve the fingerprint recognition performance of the display panel. The display panel of the present application is further described in detail below with specific embodiments.

Fingerprint recognition technology utilizes a light reflection principle. The fingerprint recognition light ray is emitted by the light emitting unit in the display panel, the fingerprint recognition light ray emitted by the light emitting unit reaches the finger and is reflected by the finger, and the light receiving unit receives the fingerprint recognition light ray reflected by the finger, so that the human fingerprint can be recognized. Specifically, according to different abilities of the human finger to reflect light at its valleys and ridges, the fingerprint recognition light rays of different intensities, reflected from the valleys and the ridges, are obtained to recognize a fingerprint image. In a process of fingerprint recognition, a refractive index of a film of the display panel in contact with the finger is close to a refractive index of a finger's skin surface, but is more different from the refractive index of air. Light reflection is weaker at an interface between two media with similar refractive indexes, and light reflection is stronger at an interface between two media with more different refractive indexes. Therefore, when the fingerprint recognition light ray is incident on a surface of the display panel in contact with the finger, the ridges of the finger are in direct contact with the surface of the display panel, so the intensity of the reflected fingerprint recognition light ray is relatively low in the position where the ridges of the finger are in contact with the display panel. Further, in the position where the valleys of the finger in contact with the display panel, the intensity of the reflected fingerprint recognition light ray is relatively high because there is an air gap between the valleys of the finger and the surface of the display panel. Consequently, the intensity of the fingerprint recognition light ray reflected from the ridges of the finger and received by the light receiving unit is relatively low, while the intensity of the fingerprint recognition light ray reflected from the valleys of the finger is relatively high, thus, in the end, obtaining a fingerprint image which is bright at the valleys of the finger and is dark at the ridges of the finger.

In order to improve the fingerprint recognition performance and present a higher-definition fingerprint recognition image, it is necessary to increase the contrast between the ridges and the valleys of the fingerprint, that is, to increase the reflection difference between the ridges and valleys of the fingerprint. Based on a working principle of fingerprint recognition technology, this can be achieved by increasing the intensity of the fingerprint recognition light ray reflected at the valleys of the fingerprint, or can be achieved by reducing the intensity of the fingerprint recognition light ray reflected at the ridges of the fingerprint, or can also be achieved by increasing the intensity of the fingerprint recognition light ray reflected at the valleys of the fingerprint and reducing the intensity of the fingerprint recognition light ray at the ridges of the fingerprint at the same time. In the present application, the optically transparent layer with the refractive index greater than the refractive index of air and less than the refractive index of the finger is disposed on the cover plate in the fingerprint recognition area, and the thickness of the optically transparent layer is set to even multiples of the half-wavelength of the fingerprint recognition light ray, thereby simultaneously improving the intensity of the fingerprint recognition light ray reflected at the valleys of the fingerprint, and weakening the intensity of the fingerprint recognition light ray reflected at the ridges of the fingerprint, thus increasing the reflection difference between the ridges and the valleys of the fingerprint, increasing the contrast between the ridges and the valleys of the fingerprint, and improving the fingerprint recognition performance.

Specifically, on the one hand, according to the principle of reflection and interference of light, it can be known that when light is incident from the optically thin medium to get reflected at the optically dense medium, a phase difference between a reflected wave and an incident wave is 180 degrees ($\pi$) resulting in the half-wave loss. When light is reflected from the optically dense medium to get reflected at the optically thin medium, no half-wave loss occurs. As shown in FIG. 2, the display panel of the present application utilizes this principle. The optically transparent layer 130 is arranged on the cover plate 120 of the display panel, the refractive index of the optically transparent layer 130 is greater than the refractive index of air and less than the refractive index of the finger 140. Therefore, when the fingerprint recognition light ray is incident on the surface of the display panel in contact with the finger, the fingerprint recognition light ray is incident from the optically thin medium to the optically dense medium at the position where the ridges of the finger 140 contact the display panel, and the reflected fingerprint recognition light ray has the half-wave loss. To be specific, a reflected fingerprint recognition light ray N2 reflected by an incident fingerprint recognition light ray N' incident on a second surface of the optically transparent layer 130 has a phase difference of 180 degrees ($\pi$) with respect to the incident fingerprint recognition light ray N'. In the position where the valleys of the finger 140 are in contact with the display panel, the fingerprint recognition light ray is incident from the optically dense medium to the optically thin medium, and the reflected fingerprint recognition light ray has no half-wave loss. To be specific, a reflected fingerprint recognition light ray P2 reflected by an incident fingerprint recognition light ray P' incident on the second surface of the optically transparent layer 130 has no phase difference with respect to the incident fingerprint recognition light ray P'.

The refractive index of the cover plate 120 is about 1.5, which is greater than the refractive index of the optically transparent layer 130. When the fingerprint recognition light ray enters the optically transparent layer 130 from the cover plate 120, the light is incident from the optically dense medium to the optically thin medium, so no half-wave loss occurs. Therefore, a reflected fingerprint recognition light ray N1 reflected by an incident fingerprint recognition light ray N incident on a first surface of the optically transparent layer 130 has no phase difference with the incident fingerprint recognition light ray N. Further, a reflected fingerprint recognition light ray P1 reflected by an incident fingerprint recognition light ray P incident on the first surface of the optically transparent layer 130 has no phase difference with respect to the incident fingerprint recognition light ray P.

On the other hand, from the principle of light interference, it can be known that when two light rays with a same frequency, a constant phase difference, and a same vibration direction meet each other while traveling in space, light interference occurs. If a phase difference between the two light rays is an odd multiple of $\pi$, then the two light rays destructively interfere with each other, and intensity of the light rays decreases after the destructive interference. If the phase difference between the two light rays is an even multiple of $\pi$, the two light rays constructively interfere with each other, and the intensity of the light rays increases after the constructive interference. As shown in FIG. 2, the thickness of the optically transparent layer 130 is the even multiple of the half-wavelength of the fingerprint recognition light ray, so a distance that the fingerprint recognition light ray travels in the optically transparent layer 130 is an integer multiple of the wavelength of the fingerprint recognition light ray, that is, a phase difference generated in the optically transparent layer 130 is an integer multiple of 2n. Since the incident fingerprint recognition light ray P or N is refracted while entering the optically transparent layer 130 from the cover plate 120, a phase does not change, that is, the incident fingerprint recognition light ray P' has no phase change relative to the incident fingerprint recognition light ray P, and the incident fingerprint recognition light ray N' has no phase change relative to the incident fingerprint recognition light ray N. Combined with the above half-wave loss and the phase change of P2/N2, the reflected fingerprint recognition light ray P2 has a phase difference of an integer multiple of 2n with respect to the incident fingerprint recognition light ray P, and the reflected fingerprint recognition light P2 has a phase difference of an integer multiple of 2n with respect to the reflected fingerprint recognition light ray P1. The reflected fingerprint recognition light ray N2 has a phase difference of an odd multiple of $\pi$ with respect to the incident fingerprint recognition light ray N, and the reflected fingerprint recognition light ray N2 has a phase difference of an odd multiple of $\pi$ with respect to the reflected fingerprint recognition light ray N1. The reflected fingerprint recognition light ray P2 and the reflected fingerprint recognition light ray P1 are two reflected fingerprint recognition light rays generated by the incident fingerprint recognition light ray P, and both have a same frequency and a same vibration direction, so constructive interference occurs during a propagation process. The reflected fingerprint recognition light ray N2 and the reflected fingerprint recognition light ray N1 are two reflected fingerprint recognition light rays generated by the incident fingerprint recognition light ray N, and both have a same frequency and a same vibration direction, so destructive interference occurs during the propagation process.

Figure 3:
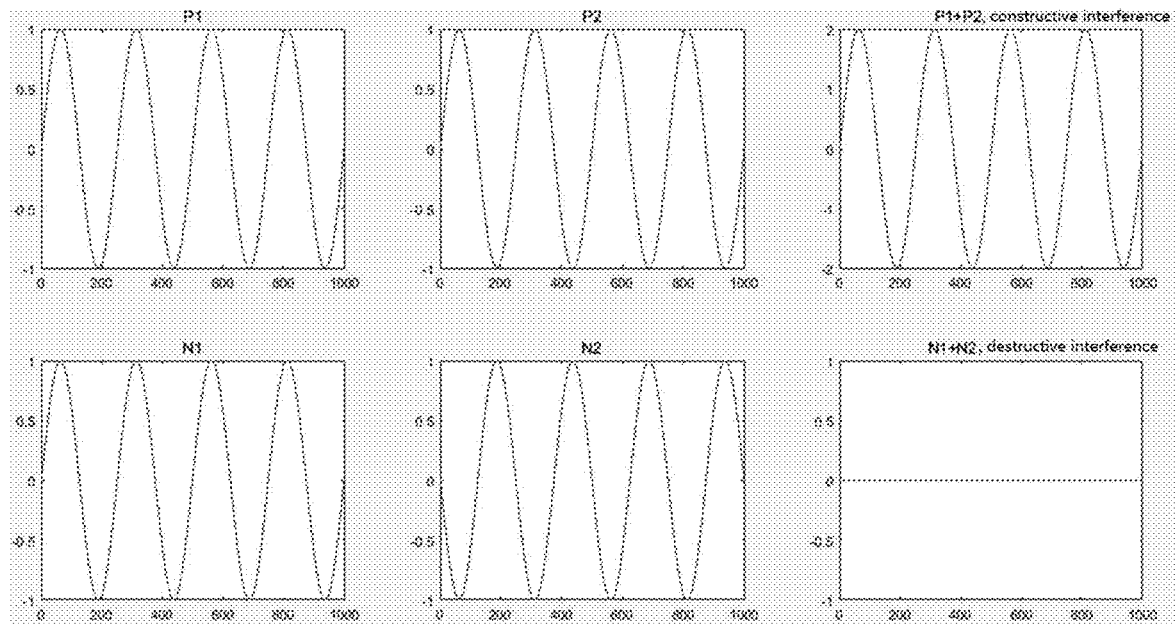
FIG. 3 is a schematic view illustrating superposition of a fingerprint reflection light ray of the display panel according to one embodiment of the present application.

As shown in FIG. 3, FIG. 3 is a schematic view showing superposition of the reflected fingerprint recognition light ray of the display panel of the present application. Specifically, FIG. 3 shows waveforms resulting from constructive interference between the fingerprint recognition light rays P1 and P2, and destructive interference between the fingerprint recognition light rays N1 and N2. As can be seen from the drawing, in the present embodiment, the optically transparent layer 130 with the refractive index greater than the refractive index of air and less than the refractive index of the finger is disposed on the cover plate 120 in the fingerprint recognition area FA, and the thickness of the optically transparent layer 130 is set to the even multiple of the half-wavelength of the fingerprint recognition light ray, thus increasing the intensity of the fingerprint recognition light ray reflected at the valleys of the finger, reducing the intensity of the fingerprint recognition light ray reflected at the ridges of the finger, increasing the reflection difference between the ridges and the valleys of the fingerprint, improving the contrast between the ridges and the valleys of the fingerprint, and hence improving the fingerprint recognition performance.

The specific configuration of the optically transparent layer 130 can be designed to meet needs and positioning of products.

In one embodiment, as shown in (a) in FIG. 1, the optically transparent layer 130 is only disposed in the fingerprint recognition area FA of the display panel. Since the fingerprint recognition area FA of conventional small and medium-sized display panels only occupies a partial area of the display panel, the optically transparent layer 130 can be arranged only in the fingerprint recognition area FA of the display panel. This way, the present application can not only improve the fingerprint recognition performance of the display panel, but also reduce a material cost of the optically transparent layer 130.

In another embodiment, as shown in (b) in FIG. 1, the optically transparent layer 130 partially covers the display panel, that is, the optically transparent layer 130 is disposed in a partial area of the display panel, and the partial area comprises the fingerprint recognition area FA. For example, as shown in (b) in FIG. 1, the partial area can be an area which is close to a lower side of the display panel and occupies one third of the display panel, and the fingerprint recognition area FA is located in the one-third partial area. Since the fingerprint recognition area FA is only a very small area in the display panel, if the optically transparent layer is only provided in this area (the fingerprint recognition area FA), the optically transparent layer 130 is subject to external forces of the finger from all directions for many times when the finger is used to operate the display panel. An edge of the optically transparent layer 130 is located on the surface of the display panel, and the edge of the optically transparent layer 130 may also be touched by the finger, which easily causes the optically transparent layer 130 to shift or be detached, thereby causing the optically transparent layer 130 to fail. However, in the present embodiment, the optically transparent layer 130 is provided in the partial area of the display panel, which comprises the fingerprint recognition area FA, so that an area occupied by the optically transparent layer 130 on the display panel is increased, and three edges of the optically transparent layer 130 are all arranged corresponding to edges of the panel, thus reducing a risk of shifting or detachment of the optically transparent layer 130 relative to the display panel. At the same time, even if the optically transparent layer 130 shifts relative to the display panel to a certain extent, the present application can also ensure that the optically transparent layer 130 always covers the fingerprint recognition area FA of the display panel, thus ensuring the fingerprint recognition performance of the display panel. On the other hand, since the refractive index of the optically transparent layer 130 is less than the refractive index of the cover plate 120, the configuration of the optically transparent layer 130 weakens a reflection effect of the display panel on external light, and has a beneficial effect of anti-reflection.

In still another embodiment, referring to (c) shown in FIG. 1, the optically transparent layer 130 is arranged to completely cover the display panel. In the present embodiment, the optically transparent layer 130 is arranged as a whole layer disposed on the surface of the display panel, edges of the optically transparent layer 130 corresponds to edges of the display panel, which further reduces a risk of shifting or detachment of the optically transparent layer 130 relative to the display panel, ensures the fingerprint recognition performance of the display panel, while ensuring flatness and evenness of the surface of the display panel and display uniformity of the display panel. By arranging the optically transparent layer 130 to completely cover the display panel, the present application reduces a reflection effect of the entire display panel on external light, and has a beneficial effect of anti-reflection.

It should be noted that, in the display panel of the present application, the optically transparent layer 130 can be a pre-prepared optically transparent film, which is attached to a surface of the cover plate 120 through an optically transparent adhesive layer, or can be directly coated on the surface of the cover plate 120 through a coating process such as evaporation, sputtering, and deposition.

Figure 4:
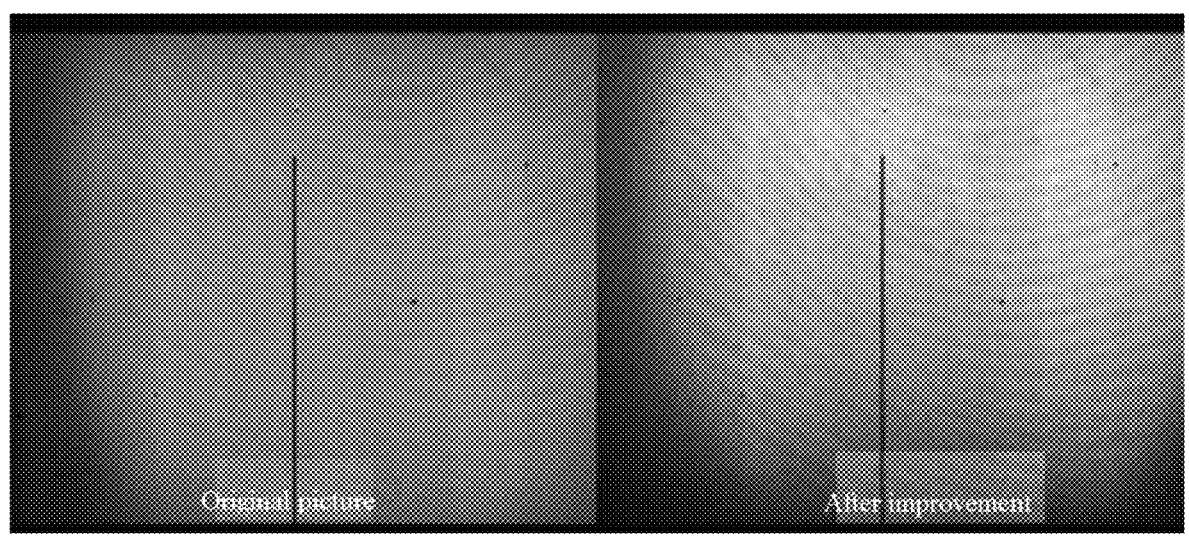
FIG. 4 is a schematic view showing fingerprint recognition performances of a conventional display panel and the display panel of the present application.

Please refer to FIG. 4, which shows fingerprint recognition performance of a conventional display panel (left) and the display panel (right) of the present application. Compared with the conventional display panel, the display panel of the present application improves the contrast between the ridges and the valleys of the fingerprint, improves the fingerprint recognition performance, and improves definition of the fingerprint image.

Correspondingly, the present application further provides a display device. The display device comprises the display panel of any embodiment of the present application, and has the technical features and technical effects of the display panel provided in any embodiment of the present application. For the details of the embodiments and their working principles, please refer to the foregoing specific embodiments, and details thereof are not repeated here.

In summary, the present application provides a display panel and a display device. The display panel comprises a fingerprint recognition area. The display panel comprises a cover plate and an optically transparent layer. The optically transparent layer at least covers a portion of the cover plate located in the fingerprint recognition area. A refractive index of the optically transparent layer is greater than a refractive index of air and less than a refractive index of a finger. A thickness of the optically transparent layer 130 is an even multiple of a half-wavelength of a fingerprint recognition light ray. In the present application, the optically transparent layer is disposed on the cover plate in the fingerprint recognition area. On the one hand, the refractive index of the optically transparent layer is set to be greater than the refractive index of air and less than the refractive index of the finger. When light is incident from an optically thin medium to get reflected at an optically dense medium, a half-wave loss occurs; no half-wave loss occurs when light is incident from the optically dense medium to get reflected at the optically thin medium. Therefore, at a position where ridges of the finger contact the display panel, the fingerprint recognition light ray is from the optically thin medium to the optically dense medium, so a reflected fingerprint recognition light ray has the half-wave loss. At a position where valleys of the finger contact the display panel, due to the presence of an air medium between the finger and the display panel, the fingerprint recognition light ray is incident from the optically dense medium to the optically thin medium, and a reflected fingerprint recognition light ray has no half-wave loss. On the other hand, a thickness of the optically transparent layer is set to an even multiple of a half-wavelength of the fingerprint recognition light ray, so that an optical path difference between reflected fingerprint recognition light rays generated by the same light ray incident on two surfaces of the optically transparent layer is an integer multiple of a wavelength of the fingerprint recognition light ray. By applying a principle of light interference, at the valleys of the fingerprint, reflected fingerprint recognition light rays reflected off the two surfaces of the optically transparent layer interfere with each other constructively, thus increasing intensity of the fingerprint recognition light ray reflected at the valleys of the fingerprint. At the ridges of the fingerprint, due to the half-wave loss, a phase difference between the reflected fingerprint recognition light rays reflected off the two surfaces of the optically transparent layer is an odd multiple of $\pi$, and the reflected fingerprint recognition light rays reflected off the two surfaces of the optically transparent layer interfere with each other destructively, thus reducing intensity of the fingerprint recognition light ray reflected at the ridges of the fingerprint. That is, by using the optically transparent layer, half-wave loss, and interference, the present application increases a reflection difference between the ridges and the valleys of the fingerprint and improves contrast between the ridges and the valleys of the fingerprint, thus improving fingerprint recognition performance.

The display panel and the display device provided by the present application are described in detail above. Specific examples are used in the present disclosure to explain the working principles and embodiments of the present application. The descriptions of the above embodiments are only used for ease of understanding the present application and its main ideas. According to the ideas of the present application, those skilled in the art can modify the specific embodiments and their applications. In summary, the content of this specification should not be construed as a limitation to the present application.

What is claimed is:

1. A display panel, comprising:
   a fingerprint recognition area, a cover plate, and an optically transparent layer, wherein the optically transparent layer at least covers a portion of the cover plate disposed in the fingerprint recognition area, a refractive index of the optically transparent layer is greater than a refractive index of air and less than a refractive index of a finger and a refractive index of the cover plate, and an optical thickness of the optically transparent layer is an even multiple of a half-wavelength of a fingerprint recognition light ray,
   wherein the optically transparent layer comprises a first surface on a side adjacent to the cover plate and a second surface on a side opposite to the cover plate,
   wherein the optically transparent layer is configured such that:
   when a fingerprint recognition light ray is reflected from the first surface and the second surface thereof at valleys of a fingerprint in contact with the optically transparent layer, the reflected fingerprint recognition light rays have a phase difference that is an integer multiple of 2π, and constructively interfere; and
   when a fingerprint recognition light ray is reflected from the first surface and the second surface thereof at ridges of the fingerprint in contact with the optically transparent layer, the reflected fingerprint recognition light rays have a phase difference that is an odd multiple of x due to a half-wave loss at the second surface, and destructively interfere, thereby increasing a fingerprint recognition contrast between the ridges and the valleys of the fingerprint.

2. The display panel according to claim 1, wherein the refractive index of the optically transparent layer is greater than 1 and less than 1.4.

3. The display panel according to claim 1, wherein the optically transparent layer is disposed in the fingerprint recognition area.

4. The display panel according to claim 1, wherein the optically transparent layer covers the portion of the cover plate disposed in the fingerprint recognition area and a portion of the cover plate extending outside the fingerprint recognition area.

5. The display panel according to claim 1, wherein the optically transparent layer completely covers the cover plate.

6. The display panel according to claim 1, wherein the optically transparent layer is an inorganic layer.

7. The display panel according to claim 6, wherein a material of the optically transparent layer comprises silicon dioxide doped with metal oxide particles.

8. The display panel according to claim 1, wherein the optically transparent layer is an organic layer.

9. The display panel according to claim 8, wherein a material of the optically transparent layer comprises acrylate doped with metal oxide particles.

10. The display panel according to claim 1, wherein light transmittance of the optically transparent layer is greater than 95%.

11. The display panel according to claim 1, wherein the display panel further comprises a light collimating unit, the light collimating unit is disposed in the fingerprint recognition area, and the light collimating unit is configured to collimate the fingerprint recognition light ray.

12. A display device comprising a display panel, the display panel comprising:
    a fingerprint recognition area, a cover plate, and an optically transparent layer, wherein the optically transparent layer at least covers a portion of the cover plate disposed in the fingerprint recognition area, a refractive index of the optically transparent layer is greater than a refractive index of air and less than a refractive index of a finger and a refractive index of the cover plate, and an optical thickness of the optically transparent layer is an even multiple of a half-wavelength of a fingerprint recognition light ray, wherein the fingerprint recognition light ray is collimated,
    wherein the optically transparent layer comprises a first surface on a side adjacent to the cover plate and a second surface on a side opposite to the cover plate,
    wherein the optically transparent layer is configured such that:
    when a fingerprint recognition light ray is reflected from the first surface and the second surface thereof at valleys of a fingerprint in contact with the optically transparent layer, the reflected fingerprint recognition light rays have a phase difference that is an integer multiple of 2π, and constructively interfere; and
    when a fingerprint recognition light ray is reflected from the first surface and the second surface thereof at ridges of the fingerprint in contact with the optically transparent layer, the reflected fingerprint recognition light rays have a phase difference that is an odd multiple of x due to a half-wave loss at the second surface, and destructively interfere, thereby increasing a fingerprint recognition contrast between the ridges and the valleys of the fingerprint.

13. The display device according to claim 12, wherein the refractive index of the optically transparent layer is greater than 1 and less than 1.4.

14. The display device according to claim 12, wherein the optically transparent layer is disposed in the fingerprint recognition area.

15. The display device according to claim 12, wherein the optically transparent layer covers the portion of the cover plate disposed in the fingerprint recognition area and a portion of the cover plate extending outside the fingerprint recognition area.

16. The display device according to claim 12, wherein the optically transparent layer completely covers the cover plate.

17. The display device according to claim 12, wherein the optically transparent layer is an inorganic layer.

18. The display device according to claim 12, wherein the optically transparent layer is an organic layer.

19. The display device according to claim 12, wherein light transmittance of the optically transparent layer is greater than 95%.

20. The display device according to claim 12, wherein the display panel further comprises a light collimating unit, the light collimating unit is disposed in the fingerprint recognition area, and the light collimating unit is configured to collimate the fingerprint recognition light ray.

* * * * *